United States Patent Office 3,438,765
Patented Apr. 15, 1969

3,438,765
METHOD FOR TOBACCO SUCKER CONTROL
Tien C. Tso, Beltsville, and George L. Steffens, Silver Spring, Md., assignors to the United States of America as represented by the Secretary of Agriculture
No Drawing. Original application Mar. 26, 1965, Ser. No. 443,106. Divided and this application Oct. 22, 1965, Ser. No. 508,414
Int. Cl. A01n 9/24, 5/00
U.S. Cl. 71—78                                                    6 Claims

ABSTRACT OF THE DISCLOSURE

A method is developed for inhibiting the growth of suckers on tobacco plants by applying to topped tobacco plants or nontopped plants having newly formed flower buds a mixture of isopropyl-N-(3-chlorophenyl) carbamate and a saturated $C_6$ to $C_{18}$ fatty alcohol. This invention relates to the discovery that, when these alcohols are mixed with amounts of synthetic growth regulators which are ordinarily too small for effective control, excellent inhibition of sucker development is achieved. Although all of the $C_6$ to $C_{18}$ saturated fatty alcohols have been found effective in the mixture, best results were obtained with octanol and decanol.

---

This application is a division of Ser. No. 443,106, filed Mar. 26, 1965.

A nonexclusive, irrevocable, royalty-free license in the invention herein described, throughout the world for all purposes of the United States Government, with the power to grant sublicenses for such purposes, is hereby granted to the Government of the United States of America.

This invention relates to a method and compositions for controlling the growth of suckers in tobacco plants. More particularly, it relates to the use of certain fatty alcohols and mixtures to control the growth of suckers, as well as to the use of these alcohols in combination with certain synthetic growth-control substances.

In usual practice of tobacco production, when plants are near the maturity stage, the flowers and several adjacent top leaves have to be removed in order to encourage the full development of the remaining leaves and to obtain desirable quality. Axillary buds or "suckers" consequently will grow after such decapitation (topping), and these must be removed continuously in order to achieve the original purpose of topping. Removal of suckers or "suckering" is usually done by hand, which is a very time-consuming and laborious operation. A number of synthetic chemical agents have been suggested and tried for this purpose; but while some of them provide adequate inhibition of sucker development and are in commercial use, other metabolic changes are induced which are considered to lower the quality of the tobacco. In addition, there is some evidence of undesirable residues of these agents in the leaf tissue when amounts sufficient to achieve adequate control are used.

An object of this invention is to provide compounds which can effectively inhibit sucker development without any undesirable side effects on the tobacco leaves. Other objects will become apparent to those skilled in the art from the description of the invention which follows.

In general, in accordance with one aspect of the invention, the objectives are achieved by applying, to the upper parts of topped tobacco plants, a $C_6$ to $C_{18}$ saturated fatty alcohol, either individually or mixtures thereof. Another aspect of the invention relates to the discovery that, when these alcohols are mixed with amounts of synthetic growth regulators which are ordinarily too small for effective control, excellent inhibition of sucker development is achieved.

In the practice of this invention, the fatty alcohol or mixture is emulsified in water in the presence of a wetting agent and sprayed onto the upper part of topped tobacco plants. Although all of the $C_6$ to $C_{18}$ saturated fatty alcohols have been found to be effective, best results were obtained with the $C_{10}$ alcohols.

The following examples are illustrative of the invention. It will be readily apparent from the widely-varying compositions that substantially any individual alcohol or mixture of alcohols within the $C_6$ to $C_{18}$ range will achieve sucker control.

Table I, below, lists the various fatty alcohols used in the illustrative examples:

TABLE I

Composition No.:                                Fatty alcohols
1 ---- 99% $C_8$ (n-octanol), 0.6% $C_{10}$ (n-decanol).
2 ---- 97% $C_{10}$ (n-decanol), 0.6% $C_8$ (n-octanol), 1.3% $C_{12}$ (n-dodecanol).
3 ---- 97% $C_{12}$ (n-dodecanol), 2% $C_{14}$ (n-tetradecanol), 1% $C_{10}$ (n-decanol).
4 ---- 67% $C_{12}$ (n-dodecanol), 26% $C_{14}$ (n-tetradecanol), 6% $C_{16}$ (n-hexadecanol), 1% $C_{10}$ (n-decanol).
5 ---- 55% $C_{12}$ (n-dodecanol), 21% $C_{14}$ (n-tetradecanol), 10% $C_8$ (n-octanol), 8% $C_{10}$ (n-decanol), 5% $C_{16}$ (hexadecanol), 1% $C_6$ (n-hexanol).
6 ---- 50% $C_{12}$ (dodecanol), 28% $C_{14}$ (n-tetradecanol), 15% $C_{16}$ (n-hexadecanol), 7% $C_8$ (n-octanol), 6% $C_{10}$ (n-decanol), 3% $C_{18}$ (n-octadecanol), 1% $C_6$ (n-hexanol).
7 ---- 54% $C_8$ (n-octanol), 40% $C_{10}$ (n-decanol), 4% $C_6$ (n-hexanol), 1% $C_{12}$ (dodecanol), 1% $C_{14}$ (n-tetradecanol).

Example 1

1 or 2 ml. of composition No. 1, substantially pure (99%) n-octanol was mixed with 0.24 to 0.45 ml. of a wetting agent, made up to 30 ml. with water, emulsified, and then sprayed onto the top of the decapitated plant. The area covered by spraying was about eight inches in diameter. This solution was permitted to drain down along the stem of the plant. This application (1 ml.) gave 100% sucker control of Maryland Catterton tobacco grown at Marlboro, Md., and an average of 83% (1 ml.) and 91% (2 ml.) of sucker control, of four types of tobacco grown at Beltsville, Md.

Example 2

1 or 2 ml. of composition No. 2, containing about 97% n-decanol was mixed with 0.24 to 0.45 ml. of a wetting agent, made up to 30 ml. with water, emulsified, and then sprayed as described previously. This composition gave 100% (1 and 2 ml.) sucker control at Marlboro, Md., on Maryland Catterton tobacco, and an average of 92% (1 ml.) and 95% (2 ml.) sucker control of four types of tobacco grown at Beltsville, Md.

Example 3

1 or 2 ml. of composition No. 3, containing about 97% n-dodecanol was mixed with 0.24 to 0.45 ml. of a wetting agent, made up to 30 ml. with water, emulsified, and then sprayed as described previously. This composition gave 99.4% (1 ml.) sucker control at Marlboro, Md., on Maryland Catterton tobacco, and an average of 46% (1 ml.) and 70% (2 ml.) sucker control of four types of tobacco grown at Beltsville, Md.

Example 4

1 or 2 ml. of composition No. 6, predominantly dodecanol, and comprising a mixture of fatty alcohols (1% $C_6$, 7% $C_8$, 6% $C_{10}$, 40% $C_{12}$, 28% $C_{14}$, 15% $C_{16}$, and 3% $C_{18}$), mixed with 0.24 to 0.45 ml. of a wetting agent, made up to 30 ml. with water, emulsified and sprayed as described previously, gave 91% (1 ml.) and 100% (2 ml.) sucker control on Maryland Catterton tobacco grown at Upper Marlboro, Md.

Example 5

2 ml. of composition No. 7, predominantly octanol, and comprising a mixture of fatty alcohols (4% $C_6$, 54% $C_8$, 40% $C_{10}$, 1% $C_{12}$, and 1% $C_{14}$), mixed with 0.24 to 0.45 ml. of a wetting agent and made up to 30 ml. with water, emulsified and sprayed as described previously, gave 99.3% sucker control on Maryland Catterton tobacco grown at Upper Marlboro, Md.

The following examples illustrate the synergistic effect produced when the fatty alcohols are mixed with synthetic growth inhibitors which, if used alone in effective concentrations, cause leaf deformities and changes in tobacco quality.

Example 6

Emulsions were prepared as described above, using 0.5 ml. portions of composition Nos. 1 and 2 to which were added 15 to 30 mg. of CIPC, isopropyl-N-(3-chlorophenyl) cabamate, per 20 ml. of solution. When sprayed on decapitated tobacco plants, 99 to 100% sucker inhibition was achieved. The amounts of CIPC were about one-tenth and one-fifth, respectively, the amounts of that agent normally required to obtain effective inhibition.

Example 7

From 50 to 100 p.p.m. of CIPC were added to 20 ml. portions of a 2.5% emulsion of composition Nos. 1 and 2, prepared as previously described. These were sprayed onto tobacco plants having newly formed flower buds. Both the flower buds and axillary buds were destroyed. By this procedure it was possible to prevent blossoming and to inhibit the development of suckers.

Table II, below, summarizes the results of tests on Maryland tobacco grown at Upper Marlboro, Md., in 1964, and shows the percent of sucker inhibition by various compositions. These data are average of 40 plants. Percent of sucker inhibition is calculated from topped, but not suckered, control plants.

TABLE II.—FATTY ALCOHOLS ON MARYLAND TOBACCO, MARLBORO, MARYLAND, 1964

| Composition No. | Treatment | Percent control | Field rating |
|---|---|---|---|
| | Control, topped, not suckered | 0 | |
| 1 | 1 ml. 99% $C_8$, 0.6% $C_{10}$ | 100 | 5− |
| 2 | 1 ml. 97% $C_{10}$, 0.6% $C_8$, 1.3% $C_{12}$ | 100 | 5 |
| 2 | 2 ml. 97% $C_{10}$, 0.6% $C_8$, 1.3% $C_{12}$ | 100 | 4 |
| 3 | 1 ml. 1% $C_{10}$, 97% $C_{12}$, 2% $C_{14}$ | 99.4 | 2.5 |
| 4 | 1 ml. 1% $C_{10}$, 67% $C_{12}$, 26% $C_{14}$, 6% $C_{16}$ | 94.8 | 2.5 |
| 5 | 1 ml. 1% $C_6$, 10% $C_8$, 8% $C_{10}$, 55% $C_{12}$, 21% $C_{14}$, 5% $C_{16}$ | 98.6 | 4+ |
| 6 | 1 ml. 1% $C_6$, 7% $C_8$, 6% $C_{10}$, 40% $C_{12}$, 28% $C_{14}$, 15% $C_{16}$, 3% $C_{18}$ | 91.0 | 2.5 |
| 6 | 2 ml. 1% $C_6$, 7% $C_8$, 6% $C_{10}$, 40% $C_{12}$, 28% $C_{14}$, 15% $C_{16}$, 3% $C_{18}$ | 100 | 2.5 |
| 7 | 1 ml. 4% $C_6$, 54% $C_8$, 40% $C_{10}$, 1% $C_{12}$, 1% $C_{14}$ | 97.4 | 5 |
| 7 | 2 ml. 4% $C_6$, 54% $C_8$, 40% $C_{10}$, 1% $C_{12}$, 1% $C_{14}$ | 99.3 | 4.5 |
| 7 | 3 ml. 4% $C_8$, 54% $C_8$, 40% $C_{10}$, 1% $C_{12}$, 1% $C_{14}$ | 100 | 4 |
| | Maleic hydrazide, 170 mg./plant | 93.6 | 5 |

From experiment results, fatty alcohols with various carbon chain lengths appeared to show little variability in their effectiveness on sucker control. Field rating as shown in Table 2, is a relative evaluation of the plant appearance in the field after treatment, as judged by leaf damage, general plant development, and other physical characteristics, 5 being the highest rating.

Table III shows the results of fatty alcohol treatment on four types of tobacco, including flue-cured, Hicks, Cigar type, Connecticut Broadleaf; Burley type, Burley 21; and Maryland type, Catterton. These tests were conducted at Beltsville, Md. The data represent an average of 24 plants from two replications. These data indicate that, although the highest percentage of sucker control was obtained with $C_{10}$ material, effective control can be obtained over the whole disclosed range of alcohols.

TABLE III.—PERCENT OF SUCKER CONTROL OF VARIOUS FATTY ALCOHOLS

| Composition No. | Composition | Variety (percent) | | | | |
|---|---|---|---|---|---|---|
| | | Hicks | Conn. Broadleaf | Burley 21 | Maryland Catterton | Average 4 Types |
| | Control, topped, not suckered | 0 | 0 | 0 | 0 | 0 |
| | Maleic hydrazide, 170 mg./plant | 76 | 91 | 95 | 94 | 89 |
| 1 | 1 ml. $C_8$ | 88 | 67 | 88 | 88 | 83 |
| 2 | 1 ml. $C_{10}$ | 75 | 95 | 100 | 99 | 92 |
| 3 | 1 ml. $C_{12}$ | 46 | 7 | 70 | 60 | 46 |
| 7 | 1 ml. 54% $C_8$, 40% $C_{10}$ | 81 | 87 | 67 | 90 | 81 |
| 4 | 1 ml. 67% $C_{12}$, 26% $C_{14}$ | 40 | 17 | 84 | 74 | 54 |
| 5 | 1 ml. 55% $C_{12}$, 21% $C_{14}$ | 85 | 73 | 95 | 83 | 84 |
| 6 | 1 ml. 40% $C_{12}$, 28% $C_{14}$, 15% $C_{16}$ | 54 | 12 | 65 | 46 | 44 |
| 1 | 2 ml. $C_8$ | 77 | 95 | 91 | 99 | 91 |
| 2 | 2 ml. $C_{10}$ | 96 | 96 | 89 | 100 | 95 |
| 3 | 2 ml. $C_{12}$ | 50 | 38 | 98 | 92 | 70 |
| 7 | 2 ml. 54% $C_8$, 40% $C_{10}$ | 97 | 93 | 100 | 100 | 98 |
| 4 | 2 ml. 67% $C_{12}$, 26% $C_{14}$ | 61 | 22 | 93 | 87 | 66 |
| 5 | 2 ml. 55% $C_{12}$, 21% $C_{14}$ | 92 | 85 | 95 | 98 | 93 |
| 6 | 2 ml. 40% $C_{12}$, 28% $C_{14}$, 15% $C_{16}$ | 61 | 32 | 91 | 92 | 69 |

In addition to the naturally occurring even-numbered fatty alcohols, odd-numbered fatty alcohols such as n-nonyl and related derivatives were also tested. Varying degrees of effectiveness in sucker control were observed.

Without wishing to be bound by any theory of why the present invention achieves the above-described results, it appears that the meristematic and differentiating cells of axillary buds are destroyed when contacted by the fatty alcohols, but the cells in the advanced stages of maturity are not affected. Fatty alcohols so used do not damage the tobacco leaves when destroying the axillary buds. Many fatty acid esters and alcohols are found in tobacco leaves and seeds. Thus the application of fatty alcohols for tobacco sucker control will not result in the introduction of substances which are foreign to the composition of the tobacco.

From the foregoing description of the preferred embodiments, it will be apparent to those skilled in the art that many changes and modifications can be made without departing from the spirit of the invention. Thus, it can be seen that the proportions of the $C_6$ to $C_{18}$ fatty alcohols set forth in Table I may be varied as desired or as dictated by the availability of naturally or artificially compounded mixtures of these alcohols.

Having described our invention, what we now claim is:

1. A method of inhibiting the growth of suckers in topped tobacco plants and in tobacco plants having newly-formed flower buds which comprises applying to such plants a mixture of isopropyl-N-(3-chlorophenyl) carbamate and a saturated $C_6$ to $C_{18}$ fatty alcohol in the proportions and at a rate effective to inhibit the growth of suckers.

2. The process of claim 1 wherein the fatty alcohol is octanol.

3. The process of claim 1 wherein the fatty alcohol is decanol.

4. A method of inhibiting the growth of suckers in topped tobacco plants and in tobacco plants having newly-formed flower buds which comprises applying to such plants an amount of an aqueous emulsion containing a mixture of isopropyl-N-(3-chlorophenyl) carbamate and a $C_6$ to $C_{18}$ fatty alcohol such that there are applied to each plant about 0.5 ml. of active fatty alcohol and from 15 to 30 mg. of carbamate.

5. The process of claim 4 wherein the fatty alcohol is octanol.

6. The process of claim 4 wherein the fatty alcohol is decanol.

References Cited

UNITED STATES PATENTS

| | | | |
|---|---|---|---|
| 3,253,904 | 5/1966 | Harrison | 71—78 |
| 3,326,664 | 6/1967 | Tso | 71—78 |

JAMES O. THOMAS, JR., *Primary Examiner.*